May 9, 1961   B. EWERT   2,983,328
MOTOR VEHICLE SUSPENSION
Filed Feb. 26, 1959   2 Sheets-Sheet 1

Inventor
Bruno Ewert
By W. O. Pettigrew
Attorney

May 9, 1961   B. EWERT   2,983,328
MOTOR VEHICLE SUSPENSION
Filed Feb. 26, 1959   2 Sheets-Sheet 2
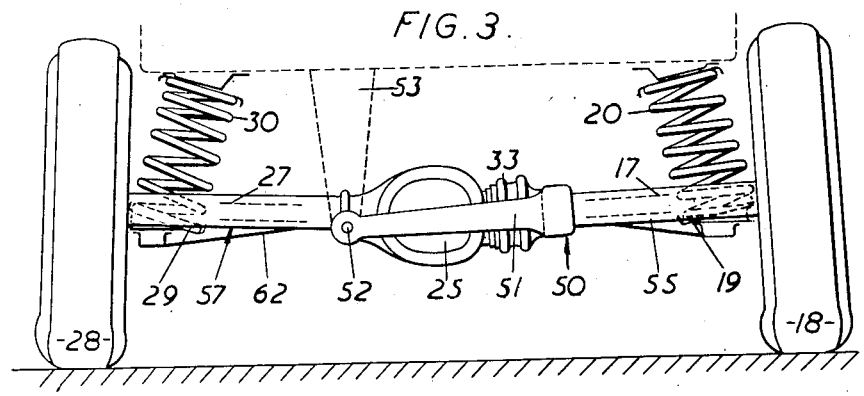
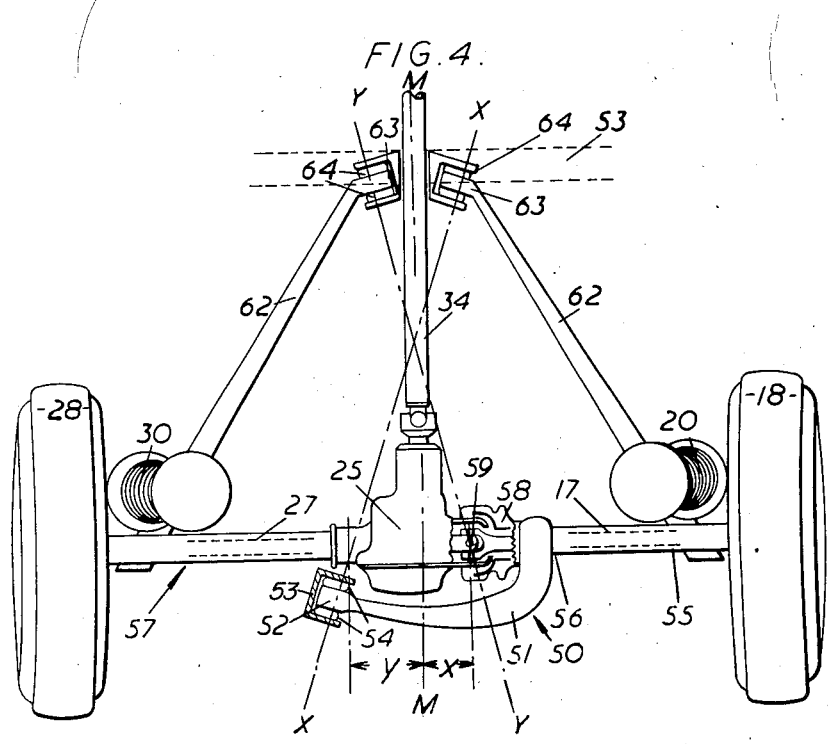
Inventor
Bruno Ewert
By
W. S. Pettigrew
Attorney United States Patent Office 2,983,328
Patented May 9, 1961

2,983,328
MOTOR VEHICLE SUSPENSION
Bruno Ewert, Russelsheim (Main), Germany, assignor to General Motors Corporation, Detroit, Mich., a corporation of Delaware
Filed Feb. 26, 1959, Ser. No. 795,864
10 Claims. (Cl. 180—73)

The invention relates to a motor vehicle suspension in which half-axles are relatively rockable.

In one such suspension, both half-axles extend across the longitudinal centre line of the vehicle, and each half-axle is pivotally connected to the frame. This means that the drive is transmitted through several universal joints, which is clearly unsatisfactory.

In another such suspension the half-axle in which the differential gear is mounted extends beyond the longitudinal centre line and is pivotally mounted on the frame. The other half-axle is pivotally connected to the first half-axle on the centre line. With this suspension, when equal spring movements occur at the left hand and right hand wheels (so called "ride" springing), the effect of extended half-axles of equal swing radii is obtained. But, under unequal springing (so called "roll" springing), the half-axle which is connected on the centre line to the other half-axle does not act as an extended half-axle; consequently the advantages of the extended lever arm are only obtained on one side of the vehicle under this springing.

In this second suspension it is not possible to compensate for the weight of the differential gear mounted in one half axle.

In a suspension according to this invention one of two half axles is pivotally connected to the vehicle frame on one side of the vehicle longitudinal centre line and the second half axle is pivotally connected to the first half axle on the other side of the longitudinal centre line.

When the suspension of this invention is used for driven axles, the half axle in which the differential gear is mounted should be pivotally connected to the half axle which is pivotally connected to the vehicle frame.

In order to equalise the moments of inertia of both half axles, the pivotal connection of the half axle in which the differential gear is mounted is advantageously located closer to the centre line than the pivotal connection of the other half axle to the frame.

Thus, in a suspension according to the invention, the changes in wheel camber and track upon vertical wheel movement are appreciably diminished in comparison with the usual arrangements because of the extended half axles and in addition, the road holding qualities of the wheels are improved and approximately equal on both sides since the invention enables the moments of inertia to be equalised. The extended half axles enable the instantaneous centre to be particularly low, which has not hitherto been really practicable.

To allow for the relative rocking of two drive half axles, a single universal joint is preferably located on the pivotal axis of the connection of the two half axles. This avoids the need for several universal joints.

The scope of the invention is defined in the appended claims; and how it may be performed is hereinafter particularly described with reference to the accompanying drawings in which:

Figure 3 is a rear elevation of another rear suspension according to the invention; and Figure 4 is a plan of the rear axle shown in Figure 3.

Figure 1:
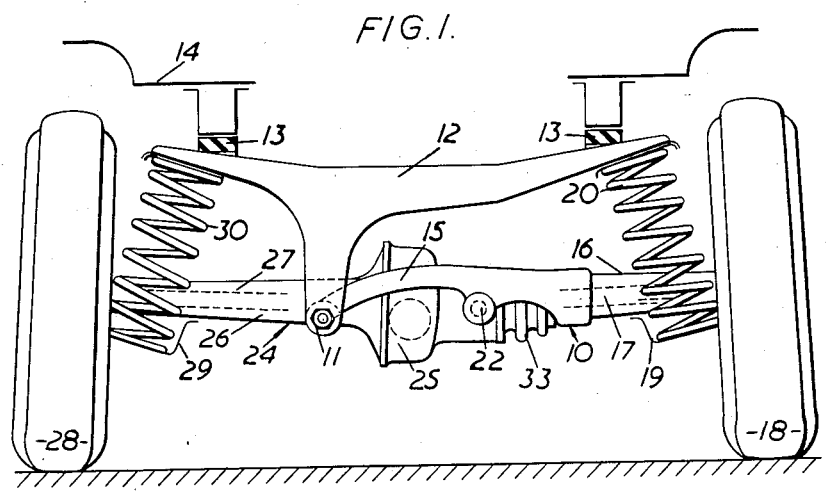
Figure 1 is a rear elevation of a rear suspension according to the invention.
Figure 2:
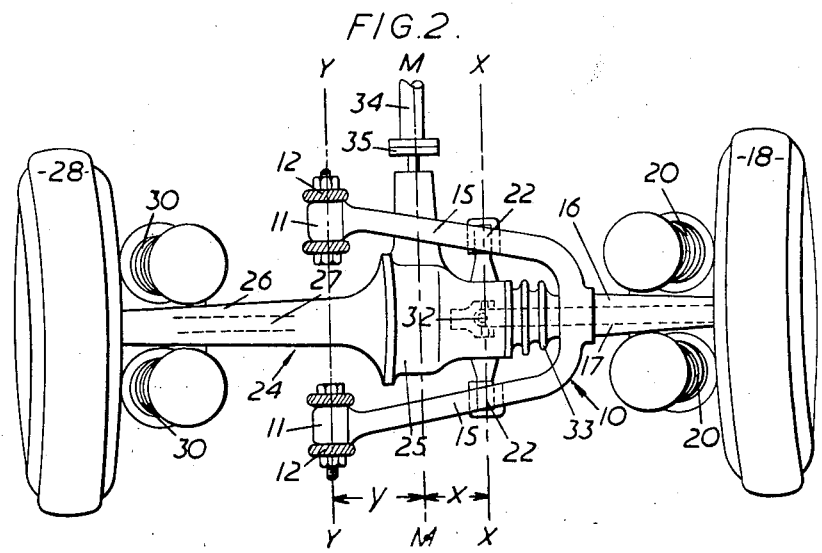
Figure 2 is a plan of the rear suspension shown in Figure 1.

In the suspension shown in Figures 1 to 2, a right hand half axle 10 extends across the longitudinal centre line M—M of the vehicle and is pivotally connected by a joint 11, which includes two longitudinally spaced apart pivotal connections, to a sub frame 12, which supports the main frame 14 on rubber blocks 13. The right hand half axle 10 consists of two parts; a forked member having bowed arms 15, and a tube 16 in which the drive half shaft 17 for the right hand rearwheel 18 is supported.

A left hand half axle 24 extends across the longitudinal centre line M—M and is pivotally connected to the bowed arms 15 of the right hand half axle by a joint 22, which includes two longitudinally spaced apart connections 22. The axle 24 has a differential gear housing 25 and a tube 26 in which the drive half shaft 27 for the left hand rear wheel 28 is mounted.

Brackets 19, 29 are fixed respectively to the right and left hand half axles 10 and 24, and support helical springs 20 and 30 respectively which are compressed between the brackets and the sub frame 12.

The right hand drive half shaft 17 has one universal joint 32 which is aligned with the pivotal axis X—X of the left hand half axle 24 and is connected through the differential gear 25 by a flange 35 to a propellor shaft 34. The left drive half shaft 27 is connected through the gear 25 by the flange 35 to the shaft 34.

A rubber sleeve 33 covers the gap between the two half axles 10 and 24.

The pivotal axes X—X and Y—Y of the joints 22 and 11 respectively are on opposite sides of the longitudinal centre line M—M of the vehicle. Although the distance between the pivotal axis X—X and the centre line M—M is less than the distance between the pivotal axis Y—Y and the centre line, the effective lengths of swing of both half axles are approximately the same both under equal (ride) springing and unequal (roll) springing. By selecting the distances X and Y it is possible to equalise the moments of inertia of the two half axles and their joints while still obtaining approximately equal effective lengths of swing. The choice of the values X and Y for the distances of the pivotal axes X—X and Y—Y from the vehicle centre line M—M thus depends on the mass distribution in the two half axles and on the pivotal action of the extended half axles.

The pairs of pivotal connections in the joints 11 and 22 for the half axles 10 and 24 help to prevent relative rotation of the half axles about a vertical axis, and relative rotation between the half axle 10 and the sub frame 12 about a vertical axis. It is however possible to have only one pivotal connection in each joint. This is shown in Figures 3–4 in which the same reference numerals are used for like parts as in Figure 1.

The right hand half axle 50 is extended by an arm 51 across the longitudinal centre line M—M, and the arm 51 is pivotally secured by a joint 52 to a sub frame 53, The joint 52 has rubber elements 54, which permit slight relative movement between the arm 51 and the sub frame 53 about axes other than X—X. The arm 51 consists of two halves pressed from sheet metal which embrace, and are welded at 56 to, a tube 55 for the drive shaft.

The left hand half axle 57 in which the differential gear 25 is mounted is pivotally connected by a ball joint 58 to the right hand half axle 50, and a universal joint 59 in the drive half shafts 17 is located within the ball joint 58.

In order to prevent the relative rocking of the half shafts and sub frame about a vertical axis, each half axle is pivotally connected by a link 62 to the sub frame 53. The joints 63, by which the links 62 are connected to the sub frame 53, include rubber elements 64 which, like the elements 54, permit slight pivotal movement in the joints 63 about axes other than Y—Y and X—X. The joints 63 should be as close as possible to the centre line M—M in order that the influence of the obliquity of the axes X—X and Y—Y relatively to the line M—M should be kept as small as possible.

The invention is not limited to the driven axles only, but may also be readily applied to non-driven half axles.

I claim:

1. A motor vehicle suspension comprising a frame, and two half axles, one of said half axles being pivotally connected to said frame on one side of the vehicle longitudinal centre line, and the second of said half axles being pivotally connected to said first half axle on the opposite side of said longitudinal centre line.

2. A motor vehicle suspension comprising a frame, and two drive half axles, a wheel mounted at the end of each half axle, and a differential gear, one of said half axles being pivotally connected to said frame on one side of the vehicle longitudinal centre line, and the second of said half axles being pivotally connected to said first half axle on the opposite side of said longitudinal centre line, said differential gear being mounted in said second half axle.

3. A motor vehicle suspension comprising a frame, two drive half axles, a wheel mounted at the end of each half axle, and a differential gear, one of said half axles being pivotally connected to said frame on one side of the vehicle longitudinal centre line, and the second of said half axles in which said differential gear is mounted being pivotally connected to said first half axle on the opposite side of and closer to said longitudinal centre line than the pivotal connection of said first half axle to said frame whereby the moments of inertia of said half axles about their pivotal connections are the same.

4. A motor vehicle suspension comprising a frame, a sub frame which resiliently supports said frame, and two half axles, one of said half axles being pivotally connected to said sub frame on one side of the vehicle longitudinal centre line, and the second of said half axles being pivotally connected to said first half axle on the opposite side of said longitudinal centre line.

5. A motor vehicle suspension comprising a frame, a sub frame on which said frame is resiliently supported, a pair of drive half axles, a wheel mounted at the outer end of each half axle, and a differential gear mounted in one of said drive half axles, said drive half axle in which said differential gear is mounted extending beyond the longitudinal centre line of the vehicle, where it is pivotally connected to the second of said drive half axles, said second drive axle being pivotally connected to said sub frame on the opposite side of said longitudinal centre line to said pivotal connection of the two half axles, said pivotal connection of said first drive half axle being closer to said centre line than said pivotal connection of said second drive axle to said sub frame so that the respective moments of inertia of said half axles about their pivotal connections are approximately the same.

6. A motor vehicle suspension comprising a frame, a sub frame on which said frame is resiliently supported, a pair of drive half axles, a wheel mounted at the outer end of each half axle, and a differential gear mounted in one of said drive half axles, said drive half axle in which said differential gear is mounted extending beyond the longitudinal centre line of the vehicle, where it is pivotally connected by two longitudinally spaced apart connections to the second of said drive half axles, said second drive axle being pivotally connected by two longitudinally spaced apart connections to said sub frame on the opposite side of said longitudinal centre line to the pivotal connection of said one and second drive axles.

7. A motor vehicle suspension comprising a frame, a sub frame on which said frame is resiliently supported, a pair of drive half axles, a wheel mounted at the outer end of each half axle, a differential gear mounted in one of said drive half axles, a pair of half shafts which transmit the drive from said gear to said wheels, and a universal joint in one of said half shafts, said drive half axle in which said differential gear is mounted extending beyond the longitudinal centre line of the vehicle, where it is pivotally connected to the second of said drive half axles, said second drive half axle being pivotally connected to said sub frame on the opposite side of said longitudinal centre line to the pivotal connection of said one and second drive axles, said universal joint being located on the pivotal axis of the pivotal connection between said one and second half axles.

8. A motor vehicle suspension comprising a frame, and a pair of half axles, one of said half axles extending beyond and to one or first side of the longitudinal centre line of the vehicle, said other or second axle having forked arms extending across said longitudinal centre line of the vehicle to the second or opposite side of said centre line to said first half axle, said first half axle being pivotally connected to said arms of said fork on said first side of the vehicle longitudinal centre line, and the fork of said half axle being pivotally connected about a longitudinal axis to said frame on said second side of said longitudinal centre line.

9. A motor vehicle suspension comprising a frame, a sub frame on which said frame is resiliently supported, a pair of drive half axles, a wheel at the outer end of each half axle, a differential gear mounted in one of said drive half axles, and one helical spring interposed between each half axle and the sub frame, a pair of drive shafts extending from said differential gear, one of said drive shafts being formed in two parts, a universal joint connecting the parts of said one drive shaft, said drive half axle in which said differential gear is mounted extending beyond and to one or first side of the longitudinal centre line of the vehicle, said other or second drive axle having forked arms extending across said longitudinal centre line of the vehicle to the opposite or second side of said centre line to said first half axle, said first half axle being pivotally connected about a longitudinal axis which passes through said universal joint of said drive shaft parts to said arms of said fork on said first side of the vehicle longitudinal centre line, and the fork of said half axle being pivotally connected to said sub frame on said second side of said longitudinal line, the distance between said centre line and the pivotal connection of said first half axle to said forked arms being smaller than the distance between said pivotal connection of said forked arms to said sub frame and said centre line whereby the moments of inertia of said half axles about their pivotal connections are approximately the same.

10. A motor vehicle suspension comprising a frame, a sub frame connected to said frame, a pair of drive half axles, a wheel at the outer end of each half axle, a differential gear mounted in one of said drive half axles, a pair of drive shafts extending from said differential gear, one of said drive shafts being formed in two parts, a universal joint connecting the parts of said one drive shaft, and a pair of links, said drive half axle in which said differential gear is mounted extending beyond and to one or first side of the longitudinal centre line of the vehicle, said other or second drive axle extending across said longitudinal centre line of the vehicle to the opposite or second side of said centre line to said first half axle, said first half axle being pivotally connected by a universal joint to second half axle, said universal joint of said drive shaft parts being located within said universal joint connecting said half axles, said second half axle being pivotally connected to said sub frame on said second side of said longitudinal centre line, and said two links being respectively fixed to said two half axles and pivotally connected to said sub frame in close proximity to said centre line so as to minimize relative rocking of said half axles about a vertical axis.

References Cited in the file of this patent

UNITED STATES PATENTS

| | | |
|---|---|---|
| 2,055,975 | Haltenberger | Sept. 29, 1936 |
| 2,854,087 | Scherenberg | Sept. 30, 1958 |